(12) United States Patent
Su et al.

(10) Patent No.: US 8,895,674 B2
(45) Date of Patent: Nov. 25, 2014

(54) METHOD FOR PROVIDING A SIDE-CHAIN DENDRIMER VESICLE

(71) Applicant: Chung-Shan Institute of Science and Technology, Armaments, Bureau, Ministry of National Defense, Taoyuan County (TW)

(72) Inventors: Wen-Chiung Su, Taoyuan County (TW); Wei-Ho Ting, Taichung (TW); Mao-Syong Lin, Taichung (TW); Chia-Cheng Chang, Taichung (TW); Hsin-Cheng Chiu, Taichung (TW); Sheng-hong Dai, Taichung (TW); Ru-Jong Jeng, Taichung (TW)

(73) Assignee: Chung-Shan Institute of Science and Technology, Armaments, Bureau, Ministry of National Defense, Taoyuan County (TW)

( * ) Notice: Subject to any disclaimer, the term of this patent is extended or adjusted under 35 U.S.C. 154(b) by 0 days.

(21) Appl. No.: 14/161,871

(22) Filed: Jan. 23, 2014

(65) Prior Publication Data
US 2014/0135451 A1 May 15, 2014

Related U.S. Application Data

(63) Continuation-in-part of application No. 13/103,047, filed on May 7, 2011, now abandoned.

(51) Int. Cl.
*C08F 257/02* (2006.01)
*C08F 8/30* (2006.01)

(52) U.S. Cl.
CPC .............. *C08F 257/02* (2013.01); *C08F 8/30* (2013.01)
USPC .......................................... 525/375; 525/127

(58) Field of Classification Search
USPC ................................. 525/375, 127
See application file for complete search history.

(56) References Cited

U.S. PATENT DOCUMENTS

2012/0130022 A1* 5/2012 Su et al. ..................... 525/375

OTHER PUBLICATIONS

Ting ("Facile synthetic route towards poly(vinyl benzyl amine) and its versatile intermediates", Polymer, 49, 1497-1505, Feb. 7, 2008).*

* cited by examiner

*Primary Examiner* — Randy Gulakowski
*Assistant Examiner* — Christopher M Rodd
(74) *Attorney, Agent, or Firm* — Jackson IPG PLLC

(57) ABSTRACT

A method disclosed for making a side-chain dendrimer vesicle. The method includes the steps of: At first, there is provided a random copolymer with a narrow distribution of molecular weights by active polymerization and chemical modification. Then, chemical modification is executed to graft various generations of dendrimers to the random copolymer to provide a side-chain dendritic random copolymer with various generations. Two steps of emulsification are taken to induce macromolecular self-assembling of the side-chain dendritic random copolymer solution to form the macromolecular vesicle. The side-chain dendrimer includes $C_{10}$~$C_{18}$ hydrophobic alkyl chains.

6 Claims, 8 Drawing Sheets

METHOD FOR PROVIDING A SIDE-CHAIN DENDRIMER VESICLE

BACKGROUND OF INVENTION

1. Field of Invention

The present invention relates to a method for providing a side-chain dendrimer vesicle and, more particularly, to a method including two steps of emulsification for causing macromolecular self-assembling of side-chain dendritic random copolymer solution for providing a macromolecular vesicle.

2. Related Prior Art

Macromolecular vesicles have been used to overcome problems related to the un-stability of liposome for some time. An approach to the problems is to use a lipid polymer to form a macromolecular vesicle. Therefore, synthetic molecule templates used for macromolecular vesicles are very important.

In 1990, Discher et al. (B. M. Discher, Y.-Y. Won, D. S. Ege, J. C. -M. Lee, F. S. Bates, D. E. Discher, D. A. Hammer, *Science* 1999, 284, 1143) disclosed the forming of a macromolecular vesicle via the self-assembling of macromolecules without using templates. The polymeric vesicles derive from diblock copolymer was called "Polymersomes" (polymer-based liposomes). Since then, macromolecular vesicles have gained a lot of attention for two major reasons. At first, macromolecular vesicles are an important issue of intra-molecular interactions and supra-molecular assembling structures. Secondly, the self-assembling structures are cell-mimetic, and exhibit the possibility of responding to other functional groups. Moreover, the macromolecular vesicles exhibit excellent stability, tens or even hundreds of times higher than that of micro-molecular phosphatide (H. Ringsdorf, B. Schlarb, J. Venzmer, *Angewandte Chemie International Edition* 1988, 27, 113; W. Meier, *Chemical Reviews* 2000, 29, 295).

In solution, amphiphilic block copolymers self-assemble into various structures such as cylindrical, wedge-like, conical, rod-like and spherical structures have been widely reported. Self-assembly behaviors of macromolecular vesicle are influenced by their chemical structures and processing conditions. Diverse geometric shapes and structures are influenced and controlled by the weight percentages of their hydrophilic soft segments (F. Ahmed, D. E. Discher, *Journal of Controlled Release* 2004, 96, 37). To prepare the macromolecular vesicles, there are four major methods including direct solution (K. K. Jette, D. Law, E. A. Schmitt, G. S. Kwon, *Pharmaceutical Research* 2004, 21, 1184), dialysis (V. P. Torchilin, *Journal of Controlled Release* 2001, 73, 137), emulsification (F. Gao, Z. -G. Su, P. Wang, G.-H. Ma, *Langmuir* 2009, 25, 3832), and solution-injection (M. E. Yildiz, R. K. Prud'homme, I. Robb, D. H. Adamson, *Polymers for Advanced Technologies* 2007, 18, 427). A lot of efforts are made on the research of block copolymers that exhibit significant structures and narrow distribution of their molecular weights. It is however difficult to precisely synthesize these block copolymers. In comparison, random copolymers exhibit many chemical functionalities and can readily be obtained. Only a few efforts are however made on the self-assembling of the random copolymers in solution because the random copolymers exhibit unidentified structures and wide ranges of molecular weights.

Self-assembling of amphiphilic random copolymers in aqueous solution to form nanometer macromolecules and to release encapsulated content by external stimulation have therefore gained a lot of attention (F. Tian, Y. Yu, C. Wang, S. Yang, *Macromolecules* 2008, 41, 3385. ; H.-C. Chiu, Y.-W. Lin, Y.-F. Huang, C.-K. Chuang, C.-S. Chern, *Angewandte Chemie International Edition* 2008, 47, 1875). Hence, adopting a practicable method to prepare a side-chain dendrimer vesicle to avoid the problems encountered in the prior art is necessary.

The present invention is therefore intended to obviate or at least alleviate the problems encountered in the prior art.

SUMMARY OF INVENTION

It is the primary objective of the present invention to provide a practical method for providing a macromolecular self-assembling of side-chain dendritic random copolymer vesicle by two step emulsification.

To achieve the foregoing objectives, the method includes the step of providing a random copolymer with a narrow distribution of molecular weights by active polymerization and chemical modification. Then, chemical modification is executed via grafting various generations of dendrimers to the random copolymer to provide a side-chain dendritic random copolymer with various generations. Two steps of emulsification are taken to cause macromolecular self-assembling of the side-chain dendritic random copolymer solution to form the macromolecular vesicle. The grafted side-chain dendrimer includes hydrophobic $C_{10}$~$C_{18}$ alkyl chains.

Other objectives, advantages and features of the present invention will be apparent from the following description referring to the attached drawings.

BRIEF DESCRIPTION OF DRAWINGS

The present invention will be described via detailed illustration of several embodiments referring to the drawings wherein.

DETAILED DESCRIPTION OF EMBODIMENTS

Figure 1:
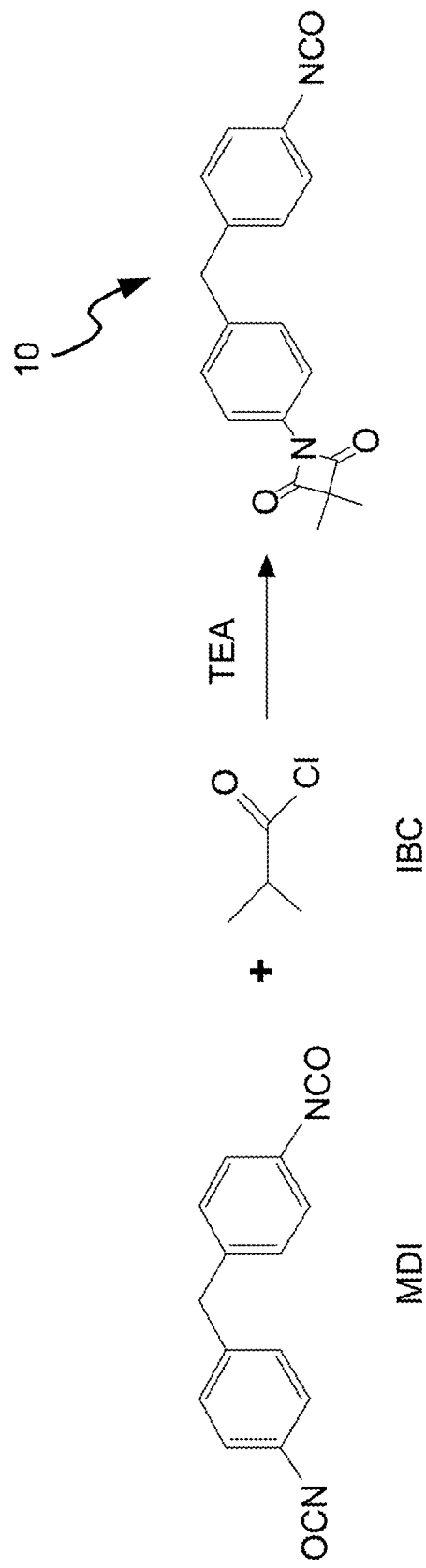
FIG. 1 shows a chemical equation for synthesizing an IDD monomer according to the present invention.

Referring to FIGS. 1 to 8, there is shown a method for providing a side-chain dendrimer vesicle according to the present invention. The method results in an improved method for providing vesicles of a size, shape, surface function and topology to increase in vivo circulation time and therefore, applicability of the nanocarriers in nanomedicine, in vivo imaging, and drug delivery. In the method, active polymerization and chemical modification are executed to provide a random copolymer that exhibits a narrow range of molecular weights. Then, chemical modification is conducted to graft various generations of dendrimers to the backbone of the random copolymer, thus forming a precise side-chain dendritic random copolymer with various generations. Two successive steps of emulsification are taken to induce macromolecular self-assembling of the side-chain dendritic random copolymer solution to form the macromolecular vesicle. There are hydrophobic function groups, $C_{10}$~$C_{18}$ alkyl chains, at the ends of the side-chain dendrimers. The general formula of the side-chain dendritic random copolymer with various generations is expressed as follows:

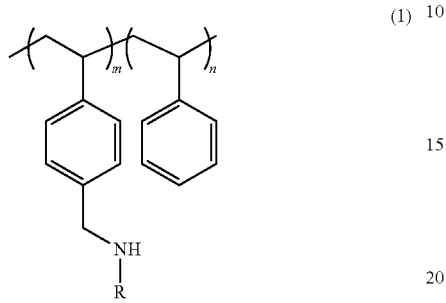

(1)

In the general formula, R represents one of various generations of dendrimers such as [G-0.5]-C18, [G-1.5]-C18 and [G-2.5]-C18 and the m/n ratio is between about 1:2 and about 1:6. In at least one embodiment, the m/n ratio is about 1:4. In at least one embodiment, the molecular weights are between about 15000 and about 80000 daltons. In at least one embodiment, the polydispersities of the random copolymers are between about 1.1 and about 1.8, including 1.2, 1.3, 1.4, 1.5, 1.6, and 1.7. In at least one embodiment, the polydispersities of the random copolymers are between 1.2 and 1.8, including between 1.3 and 1.8, between 1.4 and 1.8, between 1.5 and 1.8 and between 1.6 and 1.8.

If the dendrimer used in R is intermediate [G-0.5]-C18, the structural formula of an embodiment of the compound expressed in Equation (1) may be given as follows:

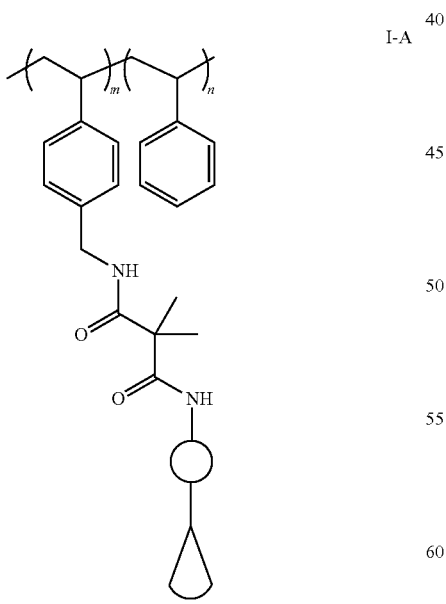

I-A

If the dendrimer used in R is the first generation of intermediate [G-1.5]-C18, the structural formula of an embodiment of the compound expressed in Equation (1) may be given as follows:

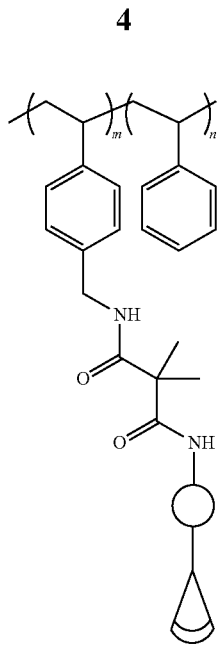

I-B

If the dendrimer used in R is the second generation of intermediate [G-2.5]-C18, the structural formula of an embodiment of the compound expressed in Equation (1) may be given as follows:

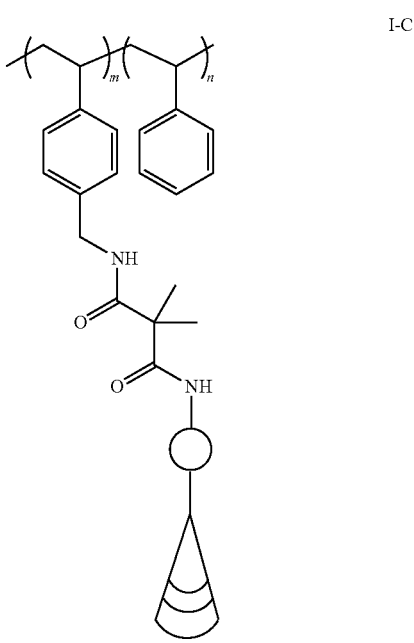

I-C

The hydrophobic function group at the end of the dendrimer may be $C_{10}H_{21}$—, $C_{12}H_{25}$—, $C_{14}H_{29}$—, $C_{16}H_{33}$— or $C_{18}H_{37}$—.

The process of the present invention will be described through detailed description of several embodiments thereof.

Embodiment #1

The Production of a Macromolecular Vesicle

At first, 10 mg of the compound I-A, I-B or I-C is dissolved in 100 ml of chloroform. Then, 5 ml of pH 5.0 phosphoric acid buffer solution is added in the solution in an ice bath. The solution is well blended in a homogenizer operated at 6000 rpm for 4 minutes to provide a first phase of emulsified mixture. The emulsified mixture is rapidly poured into about 100 ml of phosphoric acid buffer solution or de-ionized water. The solution is blended at the room temperature to provide the emulsified solution. The blending lasts for about 5 hours so that all of the organic solvent is vaporized. Finally, the resultant macromolecular vesicle is filtered by 0.2 μm filter paper, and the suspension is concentrated to 5.0 ml. According to the experimental results, the r-PS-PVBC copolymers with vinyl benzyl chloride/styrene monomer ratios larger than ½ were prepared in the same manner as the copolymers lower than ⅙. The molecular weight of the copolymers ranged between about 15,000 and about 80,000 daltons. The m to n ratios of 1:2 to 1:6 also happened to provide a good balance of hydrophilic malonamide linkages and hydrophobic lipid segments, which was favorable for the formation of vesicles. The polydipersities were between about 1.1 and about 1.8.

Embodiment #2

The Synthesis of a Dendrimer

Figure 2:
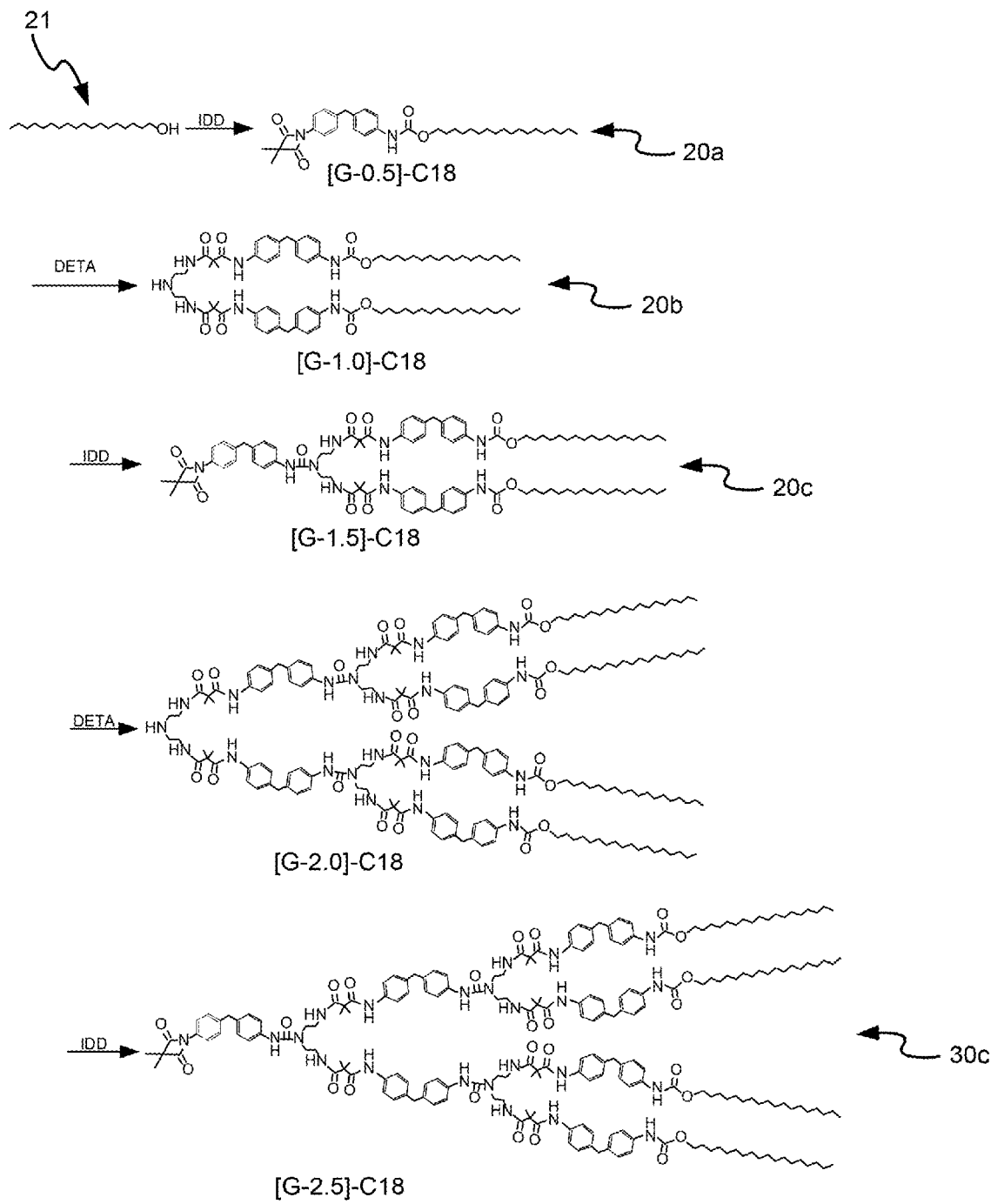
FIG. 2 shows a process for synthesizing various generations of dendrimers according to the present invention.

Referring to FIG. 1, there is shown a process for providing an IDD monomer. Referring to FIG. 2, there is shown a process for providing the first generation of dendrimers. At first, a reaction-selective monomer 10 is synthesized. The reaction-selective monomer 10 is preferably IDD (4-isocyanato-4'(3,3-dimethyl-2,4-dioxo-azetidino) diphenylmethane). To this end, methylene diphenyl diisocyanate ("MDI") reacts with isobutyryl chloride ("IBC"), with tri-ethylamine ("TEA") used as a reaction reagent.

Then, the IDD 10 and a reagent, diethylenetriamine ("DETA"), are used as building block for reaction with octadecanol 21 based on the reaction selectivity of the IDD 10. A ring-opening reaction occurs between the azetidine-2,4-dione functional group in the IDD 10 and the primary amine of DETA alternately to provide the first, second and third generations of dendrimers as shown in FIG. 2. The method for making dendrimers according to the present invention will be described through detailed description of the process for making the first generation of intermediate.

In a first phase, IDD is dissolved in tetrahydrofuran ("THF"). Octadecanol is added in the solution. Nitrogen is introduced to the solution. Reaction is conducted at 70° C. for 4 hours. After the reaction is completed, methanol is added in the solution for precipitation. The solution is stirred at 70° C. for 6 hours. Air-suction filtering is conducted to collect the product. The product is dried to provide intermediate [0-0.5]-C18 20a.

In a second phase, the [0-0.5]-C18 is dissolved in tetrahydrofuran, and nitrogen is introduced to the solution. The solution is stirred at 70° C. while DETA is slowly added in the solution. After some time of reaction, a first generation of products [0-1]-C18 is precipitated. The reaction lasts for 3 hours before the solution is cooled at the room temperature and washed with a lot of tetrahydrofuran. Air-suction filtering is conducted to provide a first generation of dendrimers [0-1]-C18 20b.

In a third phase, the [0-1]-C18 is dissolved in tetrahydrofuran. Nitrogen is introduced to the solution while the solution is blended at 70° C. After the [0-1]-C18 is completely dissolved, IDD is added in the solution, and reaction is conducted for 4 hours. A portion of the tetrahydrofuran is removed with a rotary evaporator. Methanol is added in the solution for precipitation. Air-suction filtering and drying are conducted to provide a first generation of intermediate [0-1.5]-C18 20c.

The foregoing steps are repeated to provide a second generation of intermediate [G-2.5] 30c and a third generation of intermediate [G-3.5].

Embodiment #3

The Synthesis of a Styrene Random Copolymer

Figure 3:
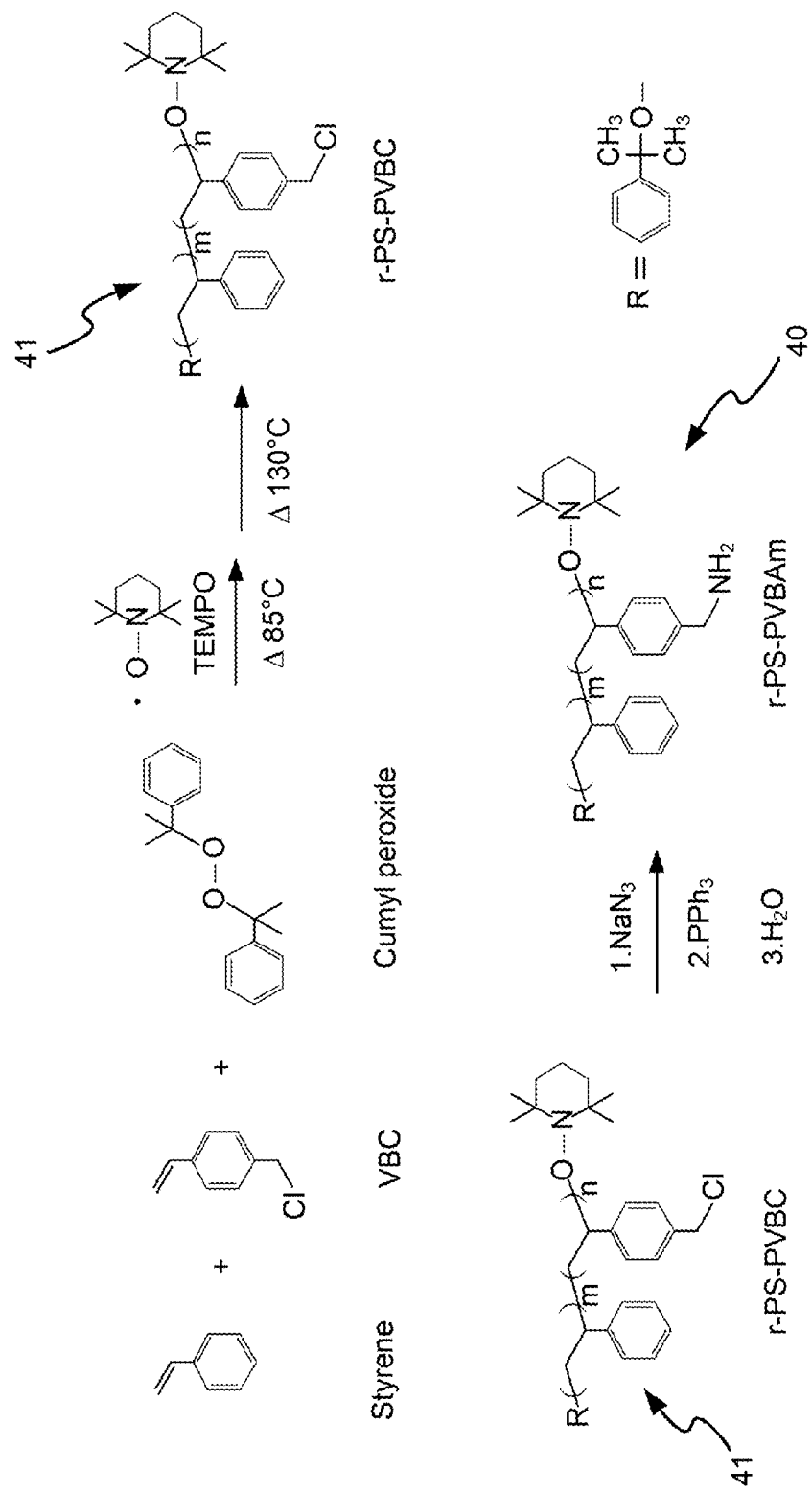
FIG. 3 shows a process for synthesizing styrene according to the present invention.

Referring to FIG. 3, there is shown a process for synthesizing a styrene random copolymer according to the present invention. For the synthesis of the random copolymer, primary amine group in the copolymer side-chain reacts with an azetidine-2,4-dione functional group in the IDD to provide a styrene random copolymer with side-chains that grafted dendrimers.

To synthesize the styrene random copolymer, 0.51 grams of cumyl peroxide are dissolved in 15 ml of toluene. Then, 30 ml of styrene and 10 ml of 4-vinylbenzyl chloride ("VBC") are added in the solution. Then, 0.59 gram of TEMPO (2,2,6,6-tetramethyl-1-piperidinyloxy, free radical) is added in the solution. Nitrogen is introduced to the solution, and reaction is conducted at 85° C. for 1 hour. The temperature is increased to 130° C., and reaction is conducted for 8 hours. The reaction is controlled, and the resultant product is dissolved in tetrahydrofuran. The solution is concentrated before a lot of methanol is added therein. Filtering and vacuum drying are conducted to provide r-PS-PVBC 41 in the form of white powder with a yield of 75%.

Then, 3 grams of the r-PS-PVBC 41 are dissolved in 25 ml of tetrahydrofuran. 0.39 gram of sodium azide ("NaN$_3$") is added in the solution. 25 ml of dimethyl sulfoxide ("DMSO") is added in the solution. Nitrogen is introduced to the solution, and reaction is conducted at 60° C. for 48 hours. Then, vacuum distillation is conducted to remove the tetrahydrofuran. A lot of de-ionized water is added in the solution, and ethyl acetate ("EA") is added in the solution for extraction. The resultant product is subjected to vacuum drying to provide r-PS-PVBAz in the form of yellow solid.

The r-PS-PVBAz is dissolved in tetrahydrofuran. Triphenylphosphine ("PPh$_3$") is added in the solution. Nitrogen is introduced to the solution, and reaction is conducted at the room temperature for 2 hours. De-ionized water is added in the solution. Vacuum drying is conducted on the resultant product to provide a styrene random copolymer r-PS-PVBAm 40 with a yield of 85%.

Embodiment #4

The Synthesis of the Compound I-A

Figure 4:
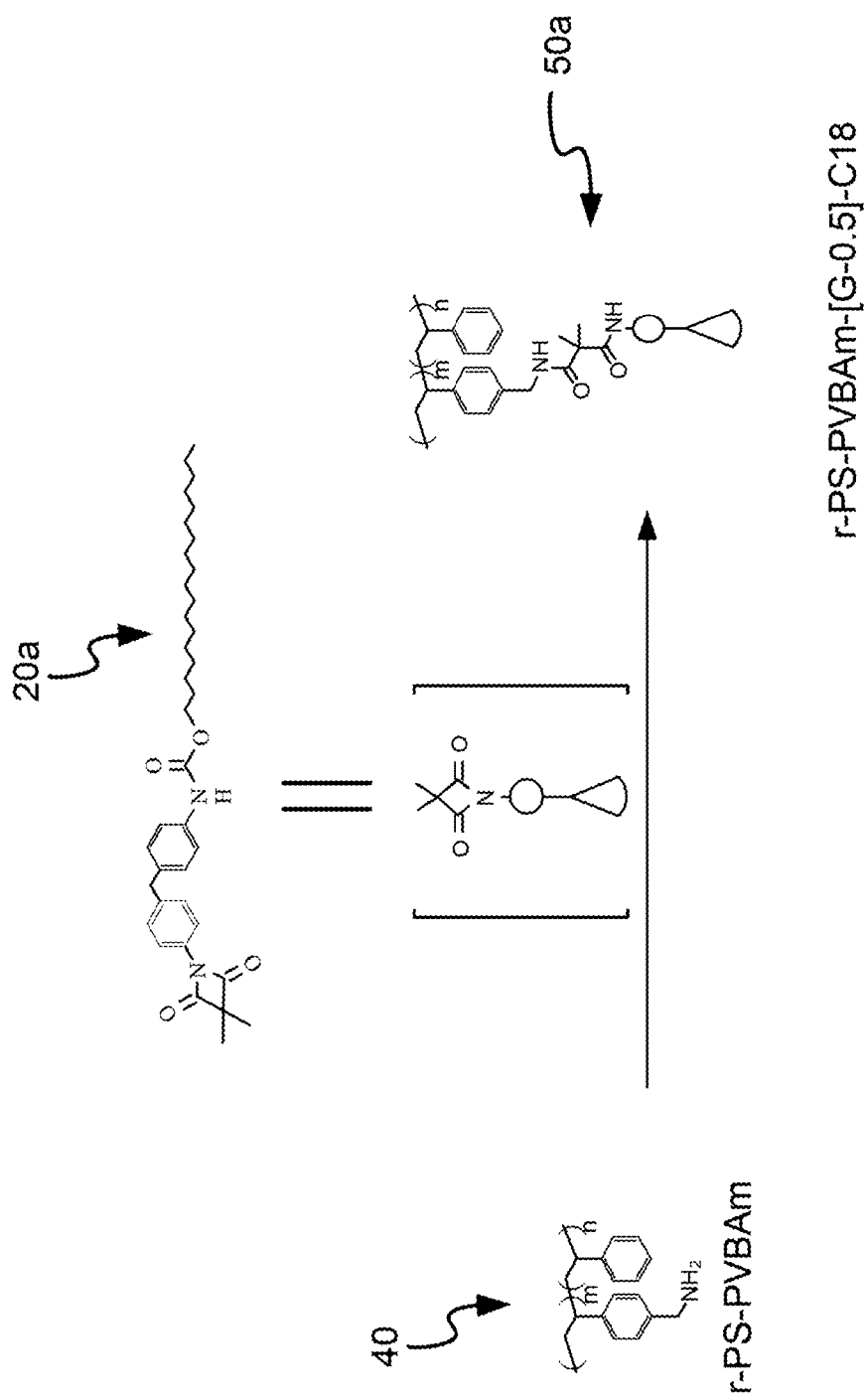
FIG. 4 shows a process for synthesizing r-PS-PVBAm-[G-0.5]-C18 according to the present invention.

Referring to FIG. 4, there is shown a process for synthesizing r-PS-PVBAm-[G-0.5]-C18. 25 ml of tetrahydrofuran is used as a solvent. 1 gram of styrene random copolymer r-PS-PVBAm 40 is dissolved in the solvent before 1.1 grams of a dendrimer [G-0.5]-C18 20a is added in the solution. At 90° C., nitrogen is introduced to the solution, and reaction is conducted for 24 hours. Column chromatography and vacuum drying are conducted on the resultant product to provide r-PS-PVBAm-[G-0.5]-C18 50a, i.e., the compound I-A in the form of yellow solid with a yield of 57%.

Embodiment #5

The Synthesis of the Compound I-B

Figure 5:
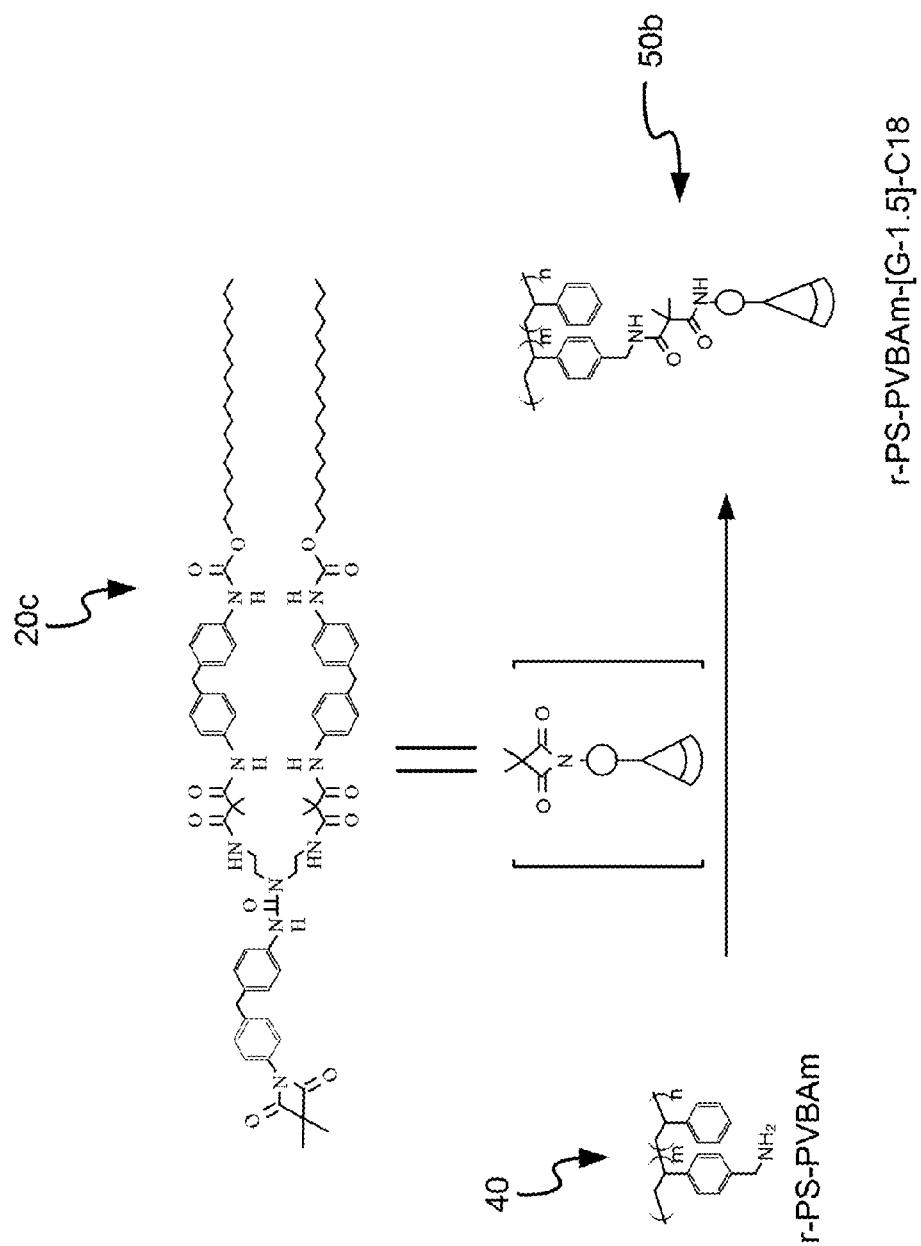
FIG. 5 shows a process for synthesizing r-PS-PVBAm-[G-1.5]-C18 according to the present invention.

Referring to FIG. 5, there is shown a process for making r-PS-PVBAm-[G-1.5]-C18. 25 ml of tetrahydrofuran is used as a solvent. 1 gram of styrene random copolymer r-PS-PVBAm 40 is dissolved in the solvent before 2.2 grams of the dendrimer [G-1.5]-C18 20c is added. At 90° C., nitrogen is introduced to the solution, and reaction is conducted for 24 hours. Column chromatography and vacuum drying are conducted on the resultant product to provide r-PS-PVBAm-[G-1.5]-C18 50b, i.e., the compound I-B in the form of a light yellow solid with a yield of 47%.

Embodiment #6

The Synthesis of the Compound I-C

Figure 6:
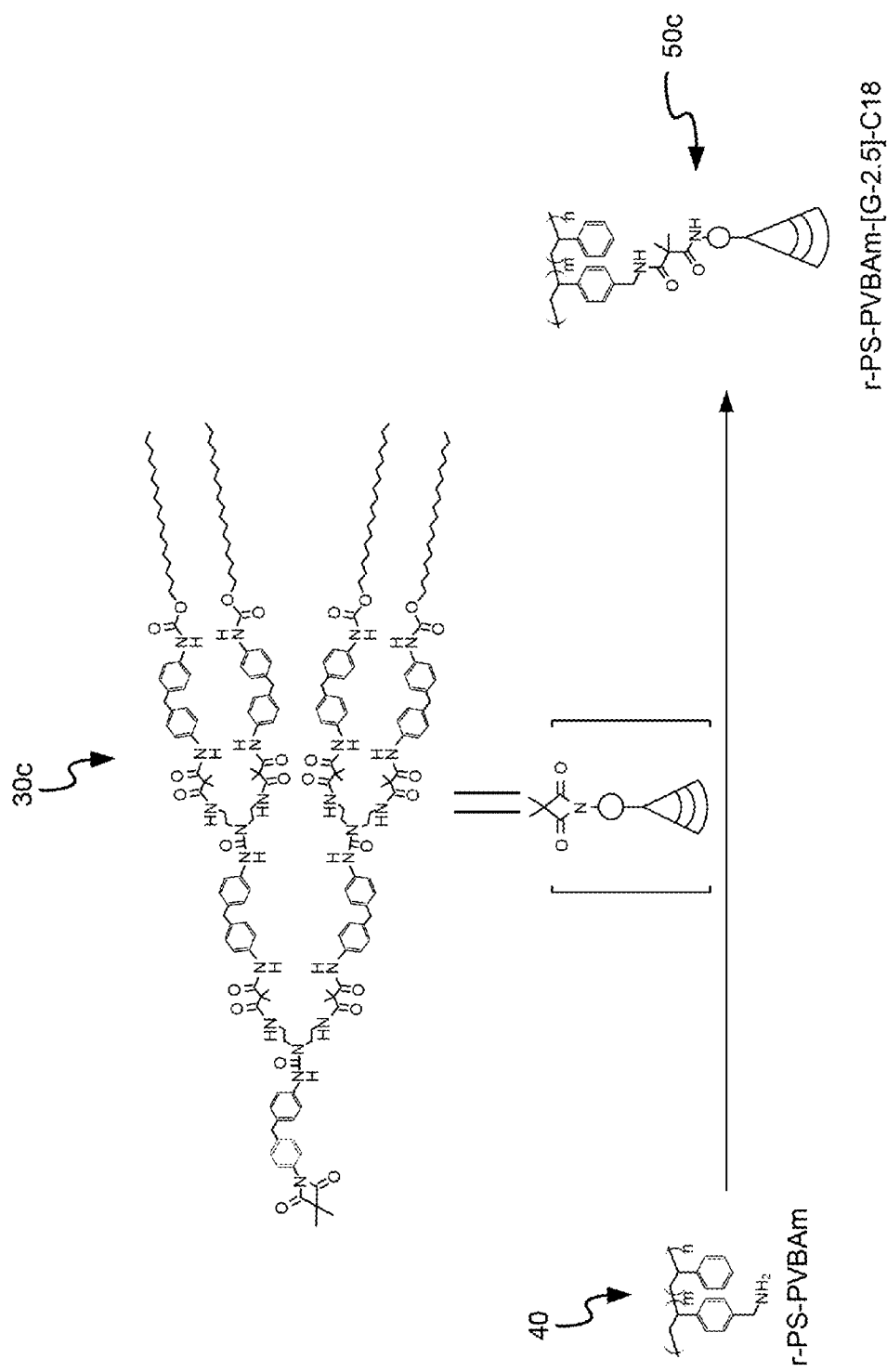
FIG. 6 shows a process for synthesizing r-PS-PVBAm-[G-2.5]-C18 according to the present invention.

Referring to FIG. 6, there is shown a process for making r-PS-PVBAm-[G-2.5]-C18 according to the present invention. 25 ml of tetrahydrofuran is used as a solvent. 1 gram of styrene random copolymer r-PS-PVBAm 40 is dissolved in the solvent before 4.8 grams of the dendrimer [G-2.5]-C18 20a is added. At 90° C., nitrogen is added, and reaction is conducted for 24 hours. Column chromatography and vacuum drying are conducted on the resultant product to provide r-PS-PVBAm-[G-2.5]-C18 50c, i.e., the compound I-C in the form of yellow solid with a yield of 32%.

Figure 7:
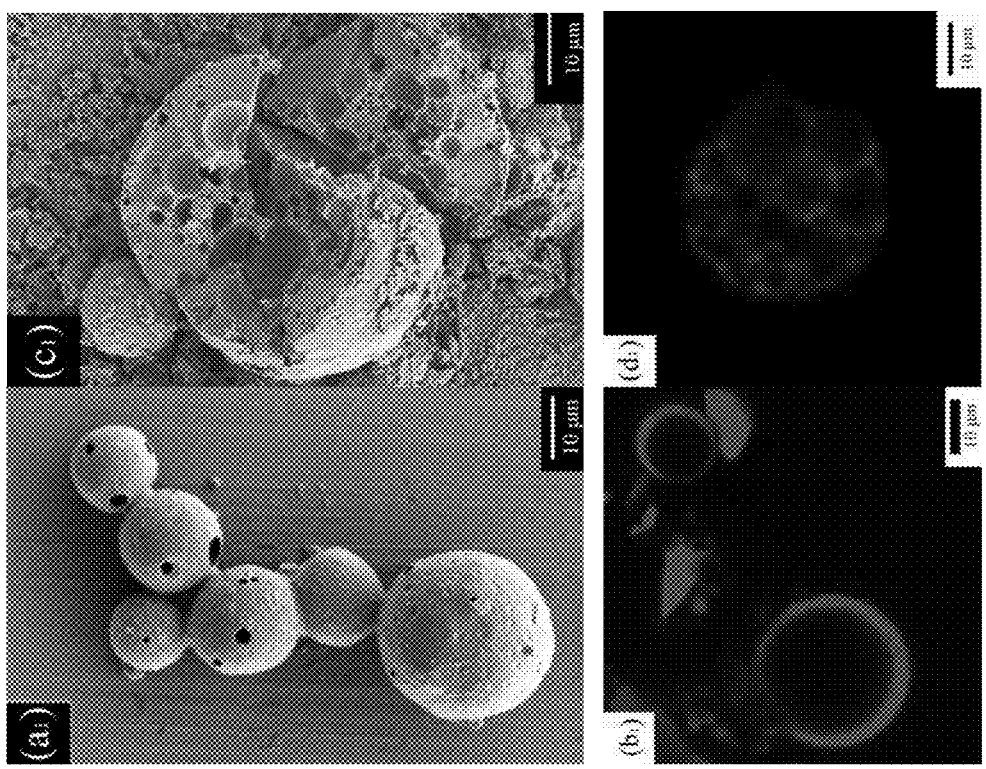
FIG. 7 is a microscopic photograph of a compound I-B according to the present invention.
Figure 8:
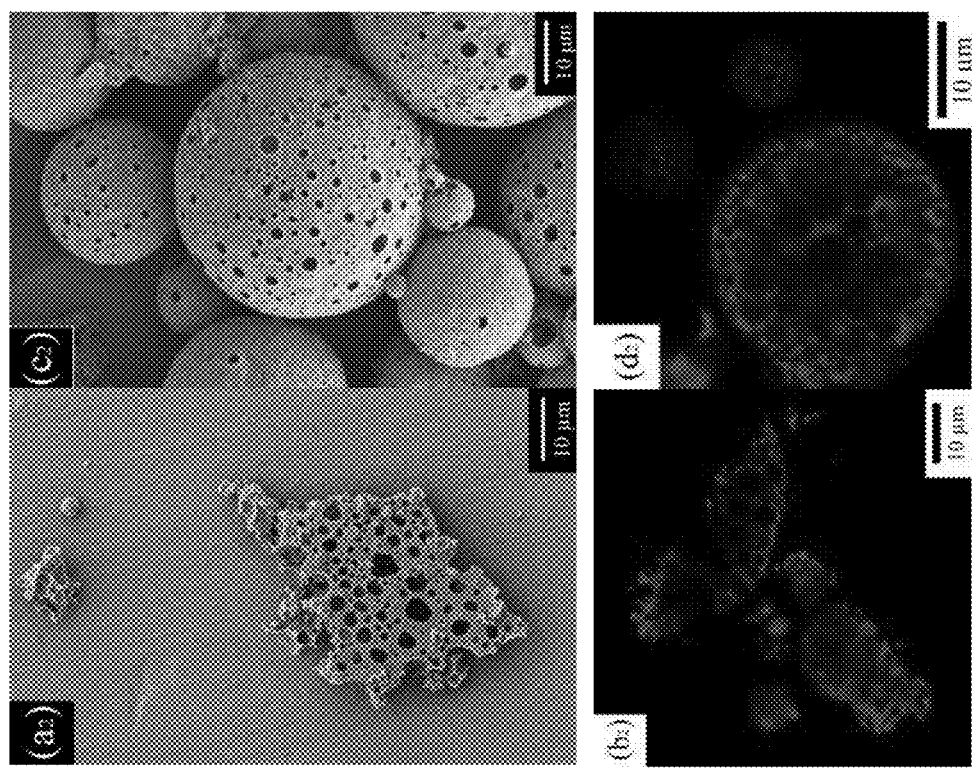
FIG. 8 is a microscopic photograph of a compound I-C according to the present invention.

FIG. 7 is a microscopic photograph of the compound I-B. FIG. 8 is a microscopic photograph of the compound I-C. The macromolecular vesicles made in Embodiments #5 and #6 are shown. Upper portions ($a_1$) and ($c_1$) of FIG. 7 are photographs of the compound I-B taken by a scanning electron microscope ("SEM"). Lower portions ($b_1$) and ($d_1$) are photographs of the compound I-B taken by a confocal laser scanning microscope ("CLSM"). Upper portions ($a_2$) and ($c_2$) of FIG. 8 are photographs of the compound I-C taken by a scanning electron microscope. Lower portions ($b_2$) and ($d_2$) are photographs of the compound I-C taken by a confocal laser scanning microscope.

The side-chain dendritic copolymer in the Embodiments provide m to n ratios of between ½ and ⅙ which provided a good balance of hydrophilic malonamide linkages and hydrophobic lipid segments, favorable for the formation of vesicles. This balance concept for preparing vesicles can be reviewed in Chiu et al., Angew. Chem. Int. Ed, 47, 1875-1878 (2008).

The vesicles provided herein were prepared substantially as the vesicles in Chiu et al. According to experimental results, the r-PS-PVBC copolymers with vinyl benzyl chloride/styrene monomer ratios larger than ½ were prepared in the same manner as the copolymers lower than ⅙. The molecular weight of the copolymers was between about 15,000 and about 80,000 daltons. The polymers in the Chiu et al. paper had lower molecular weights (under 5000 gmol-1) because vinyl benzyl chloride is a more reactive monomer when compared to styrene.

As discussed above, the method for making a side-chain dendrimer vesicle according to the present invention overcomes the problems related to the prior art. Control can be exerted over size, shape surface function and topology of the polymeric vesicles, which will influence the in vivo circulation time and therefore the applicability of these nanocarriers. Consequently, applications of these vesicles are foreseen in nanomedicine, in vivo imaging, and drug delivery.

According to the present invention, dendrimers are grafted to a styrene random copolymer. Two steps of emulsification are taken to induce the side-chain dendritic random copolymer solution self-assembling into the macromolecular vesicle. There are hydrophobic functional groups, $C_{10}$~$C_{18}$ alkyl chains at the ends of the side-chain dendrimers.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:
1. A method for making a side-chain dendrimer vesicle including the steps of:
providing a random copolymer with a narrow distribution of molecular weights by active polymerization and chemical modification;
executing chemical modification to graft various generations of dendrimers to the random copolymer to provide a side-chain dendritic random copolymer with various generations; and
taking two steps of emulsification to cause macromolecular self-assembling of the side-chain dendritic random copolymer solution to form a macromolecular vesicle, wherein the side-chain dendrimer includes a hydrophobic alkyl chain being $C_{18}H_{37}$—, wherein the structural formula of the side-chain dendritic random copolymer with various generations is as follows:

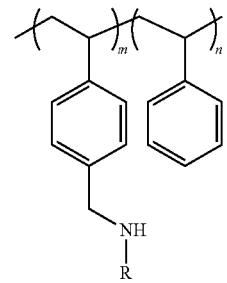

wherein R represents one of the generations of dendrimers including [G-0.5]-C18, [G-1.5]-C18 and [G-2.5]-C18 and wherein the m to n ratio is 1:4 and wherein the molecular weights are between about 15000 and about 80000 daltons.

2. The method according to claim 1, wherein the dendrimers synthesis of the side-chain dendrimer is based on a reaction of a primary amine group with an azetidine-2,4-dione functional group of the dendrimer, thus providing styrene random copolymers including grafted dendrimers as side chains.

3. The method according to claim 2, wherein the styrene random copolymer is r-PS_PVBAm and is dissolved in DMSO before a dendrimer is added to the solution and nitrogen is introduced to the solution for reaction wherein the azetidine-2,4-diones of the dendrimers react only with aliphatic primary amines to form malamide linkages at 70° C. and wherein, after reaction, the solution is put in methanol and a precipitate of r-PS-PVBAm-R is obtained, wherein R represents one of the various generations of dendrimers.

4. The method according to claim 1, wherein the compound with the side-chain dendritic random copolymer with various generations of dendrimers is dissolved in the solution before phosphoric acid buffer solution is added in the solution in a bath, and the solution is well stirred to provide a first phase of emulsified mixture, and the emulsified mixture is added in phosphoric acid buffer solution or de-ionized water and stirred at the room temperature to provide emulsification solution until all of the organic solvents are evaporated, and the resultant macromolecular vesicle suspension is filtered and concentrated.

5. The method according to claim 1, wherein a polydispersities of the random copolymers are between about 1.1 and about 1.8.

6. A dendrimer vesicle made in the method according to claim 1.

* * * * *